United States Patent
Qi et al.

(10) Patent No.: US 11,657,214 B2
(45) Date of Patent: May 23, 2023

(54) MESSAGE INPUT AND DISPLAY METHOD AND APPARATUS, ELECTRONIC DEVICE AND READABLE STORAGE MEDIUM

(71) Applicant: DINGTALK HOLDING (CAYMAN) LIMITED, Grand Cayman (KY)

(72) Inventors: Guoning Qi, Hangzhou (CN); Feng Bao, Hangzhou (CN); Lili Zhang, Hangzhou (CN)

(73) Assignee: DINGTALK HOLDING (CAYMAN) LIMITED, Grand Cayman (KY)

( * ) Notice: Subject to any disclaimer, the term of this patent is extended or adjusted under 35 U.S.C. 154(b) by 0 days.

(21) Appl. No.: 17/825,819

(22) Filed: May 26, 2022

(65) Prior Publication Data

US 2022/0292252 A1    Sep. 15, 2022

Related U.S. Application Data

(63) Continuation of application No. 17/477,586, filed on Sep. 17, 2021, now Pat. No. 11,361,145, which is a (Continued)

(30) Foreign Application Priority Data

Mar. 18, 2019 (CN) .......................... 201910204530.0

(51) Int. Cl.
*G06F 40/166* (2020.01)
*G06F 40/205* (2020.01)
(Continued)

(52) U.S. Cl.
CPC .......... *G06F 40/166* (2020.01); *G06F 3/0481* (2013.01); *G06F 40/205* (2020.01); *G06F 40/106* (2020.01); *H04L 51/04* (2013.01)

(58) Field of Classification Search
CPC .... G06F 40/106; G06F 3/0481; G06F 40/166; G06F 9/451; H04L 51/04
See application file for complete search history.

(56) References Cited

U.S. PATENT DOCUMENTS 7,614,011 B2    11/2009    Kardis et al.
7,925,305 B2    4/2011    Honda
(Continued)

FOREIGN PATENT DOCUMENTS

| CN | 102750106 A | 10/2012 |
| CN | 102830977 A | 12/2012 |
| CN | 105242924 A | 1/2016 |

OTHER PUBLICATIONS

Written Opinion of the International Searching Authority and International Search Report for PCT Application No. PCT/CN2020/078526 dated Jun. 4, 2020.
(Continued)

*Primary Examiner* — Asher D Kells (57) ABSTRACT

Disclosed are a message input and display method, apparatus, electronic device, and readable storage medium. The message input method may comprise: displaying a session interface corresponding to a communication session; in a normal input mode, displaying a communication message in a first sub-area of a content display area of the session interface, and displaying a message input interface in a second sub-area; and in a full-screen input mode, displaying the message input interface in the content display area.

20 Claims, 8 Drawing Sheets

Related U.S. Application Data continuation of application No. PCT/CN2020/078526, filed on Mar. 10, 2020.

(51) Int. Cl.
    *G06F 3/0481*     (2022.01)
    *G06F 40/106*     (2020.01)
    *H04L 51/04*     (2022.01)

(56) References Cited

U.S. PATENT DOCUMENTS

| | | | |
|---|---|---|---|
| 8,560,724 B2 | 10/2013 | Shenfield | |
| 8,909,810 B2 | 12/2014 | Caine et al. | |
| 9,286,277 B2 * | 3/2016 | Huo | G06F 40/106 |
| 2003/0222923 A1 | 12/2003 | Li | |
| 2004/0162877 A1 * | 8/2004 | Van Dok | G06F 40/109 |
| | | | 709/204 |
| 2004/0233146 A1 | 11/2004 | Nguyen | |
| 2006/0130109 A1 * | 6/2006 | Zenith | H04N 7/17318 |
| | | | 348/E7.071 |
| 2006/0146788 A1 | 7/2006 | Brown et al. | |
| 2006/0248150 A1 | 11/2006 | Chaar et al. | |
| 2008/0055269 A1 * | 3/2008 | Lemay | H04M 1/72436 |
| | | | 345/169 |
| 2008/0109752 A1 * | 5/2008 | Bayley | G06F 9/451 |
| | | | 707/E17.119 |
| 2009/0005011 A1 * | 1/2009 | Christie | G06Q 10/107 |
| | | | 455/412.2 |
| 2009/0006991 A1 | 1/2009 | Lindberg et al. | |
| 2009/0160785 A1 * | 6/2009 | Chen | G06F 3/04883 |
| | | | 345/173 |
| 2009/0177981 A1 * | 7/2009 | Christie | H04L 12/1831 |
| | | | 715/758 |
| 2009/0214191 A1 | 8/2009 | Allard | |
| 2009/0273568 A1 | 11/2009 | Milner et al. | |
| 2010/0020092 A1 | 1/2010 | Canu et al. | |
| 2010/0171753 A1 | 7/2010 | Kwon | |
| 2012/0039505 A1 * | 2/2012 | Bastide | G06F 3/013 |
| | | | 715/800 |
| 2012/0290967 A1 * | 11/2012 | Scott | G06F 3/0481 |
| | | | 715/780 |
| 2013/0275519 A1 | 10/2013 | Nichols | |
| 2013/0305144 A1 | 11/2013 | Jackson et al. | |
| 2014/0201661 A1 * | 7/2014 | Allen | G06F 3/0486 |
| | | | 715/769 |
| 2015/0143264 A1 | 5/2015 | Allen et al. | |
| 2015/0304251 A1 | 10/2015 | Greenberg et al. | |
| 2015/0317293 A1 * | 11/2015 | Greisson | H04M 1/72436 |
| | | | 715/256 |
| 2016/0246466 A1 * | 8/2016 | Waddell | G06F 3/0237 |
| 2017/0286913 A1 | 10/2017 | Liu et al. | |
| 2017/0336960 A1 * | 11/2017 | Chaudhri | H04N 5/232933 |
| 2018/0159810 A1 * | 6/2018 | Buchheit | H04L 51/216 |
| 2020/0379638 A1 * | 12/2020 | Zhu | G06F 3/016 |

OTHER PUBLICATIONS

International Preliminary Report on Patentability Chapter I for PCT Application No. PCT/CN2020/078526 dated Dec. 30, 2021.

"How to into Full-screen Edit?", Handcent, retrieved on Jan. 20, 2022, https://www.handcent.com/dir/new/help/doHelp?hid=318, 2 pages.

Notice of Allowance for U.S. Appl. No. 17/477,586 dated Feb. 10, 2022.

* cited by examiner

MESSAGE INPUT AND DISPLAY METHOD AND APPARATUS, ELECTRONIC DEVICE AND READABLE STORAGE MEDIUM

CROSS-REFERENCE TO RELATED APPLICATIONS

The present application is a continuation application of the U.S. patent application Ser. No. 17/477,586 filed Sep. 17, 2021 and entitled "MESSAGE INPUT AND DISPLAY METHOD AND APPARATUS, ELECTRONIC DEVICE AND READABLE STORAGE MEDIUM," which is a continuation application of the International Patent Application No. PCT/CN2020/078526, filed on Mar. 10, 2020 and entitled "MESSAGE INPUT AND DISPLAY METHOD AND APPARATUS, ELECTRONIC DEVICE AND READABLE STORAGE MEDIUM." The International Patent Application No. PCT/CN2020/078526 claims priority to Chinese Patent Application No. 201910204530.0, filed on Mar. 18, 2019 and entitled "MESSAGE INPUT AND DISPLAY METHOD AND APPARATUS, ELECTRONIC DEVICE AND READABLE STORAGE MEDIUM." The entire contents of all of the above-identified applications are incorporated herein by reference in their entirety.

TECHNICAL FIELD

One or more embodiments of this specification relate to the field of communication technologies, and in particular, to a message input and display method, apparatus, electronic device, and readable storage medium.

BACKGROUND

In the related art, users may implement message receiving and sending by using a communication application. For example, the communication application may be an instant messaging application or an enterprise instant messaging application, to implement efficient communication between users. The communication application may support a plurality of communication forms. For example, a single chat session is established between one user and another user, to implement one-to-one communication between the users, or a group is established among a plurality of users, and a group chat session is established based on the group, to implement multi-party communication among the plurality of users.

SUMMARY

In view of this, one or more embodiments of this specification provide a message input and display method, apparatus, electronic device, and readable storage medium.

To achieve the foregoing objective, one or more embodiments of this specification provide the following technical solutions.

According to a first aspect of the one or more embodiments of this specification, a message input method is provided, including: displaying a session interface corresponding to a communication session; in a normal input mode, displaying a communication message in a first sub-area of a content display area of the session interface, and displaying a message input interface in a second sub-area; and in a full-screen input mode, displaying the message input interface in the content display area.

According to a second aspect of the one or more embodiments of this specification, a message display method is provided, including: obtaining a communication message generated in a communication session; when the communication message is a communication message in a normal format, invoking a normal processing module to parse the communication message; when the communication message is a communication message in a special format, invoking an advanced processing module to parse the communication message; and displaying message content obtained through parsing in a session interface corresponding to the communication session.

According to a third aspect of the one or more embodiments of this specification, a message input apparatus is provided, including: an interface display unit, configured to display a session interface corresponding to a communication session; a first display unit, configured to: in a normal input mode, display a communication message in a first sub-area of a content display area of the session interface, and display a message input interface in a second sub-area; and a second display unit, configured to: in a full-screen input mode, display the message input interface in the content display area.

According to a fourth aspect of the one or more embodiments of this specification, a message display apparatus is provided, including: an obtaining unit, configured to obtain a communication message generated in a communication session; a first invoking unit, configured to: when the communication message is a communication message in a normal format, invoke a normal processing module to parse the communication message; a second invoking unit, configured to: when the communication message is a communication message in a special format, invoke an advanced processing module to parse the communication message; and a display unit, configured to display message content obtained through parsing in a session interface corresponding to the communication session.

According to a fifth aspect of the one or more embodiments of this specification, an electronic device is provided, including: a processor; and a memory configured to store instructions executable by the processor, where the processor executes the executable instructions to implement the method according to the first aspect.

According to a sixth aspect of the one or more embodiments of this specification, a computer-readable storage medium is provided, storing computer instructions, where when the instructions are executed by a processor, steps of the method according to the first aspect are implemented.

According to a seventh aspect of the one or more embodiments of this specification, an electronic device is provided, including: a processor; and a memory configured to store instructions executable by the processor, where the processor executes the executable instructions to implement the method according to the second aspect.

According to an eighth aspect of the one or more embodiments of this specification, a computer-readable storage medium is provided, storing computer instructions, where when the instructions are executed by a processor, steps of the method according to the second aspect are implemented.

In some embodiments, a message input method includes: displaying, by a client, a session interface corresponding to a communication session; in a normal input mode, displaying, by the client, a communication message in a first sub-area of a content display area of the session interface, and displaying a message input interface in a second sub-area of the content display area of the session interface; monitoring, by the client, a message content being inputted by a user at the session interface; in response to determining an amount of the message content exceeding a threshold, switching, by the client, from the normal input mode to a full-screen input mode; and in the full-screen input mode, expanding, by the client, the display of the message input interface to the content display area entirely.

In some embodiments, one or more non-transitory computer-readable storage media stores instructions executable by one or more processors, wherein execution of the instructions causes the one or more processors to perform operations comprising: displaying a session interface corresponding to a communication session; in a normal input mode, displaying a communication message in a first sub-area of a content display area of the session interface, and displaying a message input interface in a second sub-area of the content display area of the session interface; monitoring a message content being inputted by a user at the session interface; in response to determining an amount of the message content exceeding a threshold, switching from the normal input mode to a full-screen input mode; and in the full-screen input mode, expanding the display of the message input interface to the content display area entirely.

In some embodiments, a system comprises one or more processors and one or more non-transitory computer-readable memories coupled to the one or more processors and configured with instructions executable by the one or more processors to cause the system to perform operations comprising: displaying a session interface corresponding to a communication session; in a normal input mode, displaying a communication message in a first sub-area of a content display area of the session interface, and displaying a message input interface in a second sub-area of the content display area of the session interface; monitoring a message content being inputted by a user at the session interface; in response to determining an amount of the message content exceeding a threshold, switching from the normal input mode to a full-screen input mode; and in the full-screen input mode, expanding the display of the message input interface to the content display area entirely.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of this specification, but are instead only examples of methods and apparatuses that are described in detail in the appended claims and that are consistent with some aspects of one or more embodiments of this specification.

In other embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Figure 1:
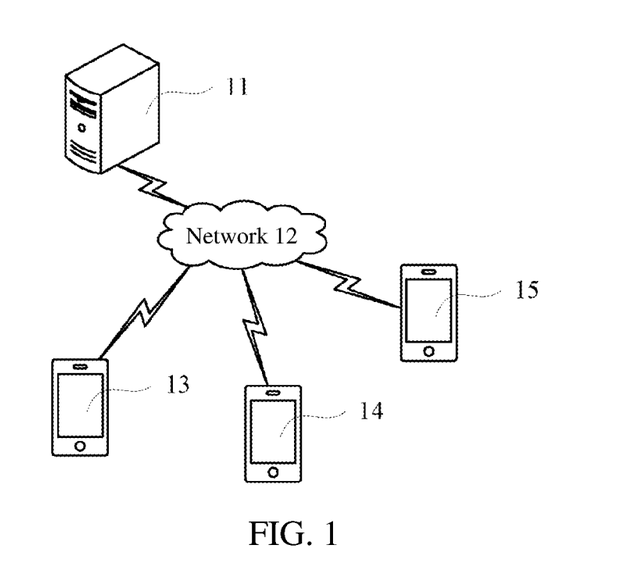
FIG. 1 is a schematic architectural diagram of a communication system, according to an exemplary embodiment.

FIG. 1 is a schematic architectural diagram of a communication system, according to an exemplary embodiment. As shown in FIG. 1, the system may include a server 11, a network 12, and a plurality of electronic devices such as a mobile phone 13, a mobile phone 14, and a mobile phone 15.

The server 11 may be a physical server including an independent host computer. Alternatively, the server 11 may be a virtual server carried by a host computer cluster. During operations, the server 11 may run a program on a server side of an application, to implement a related service function of the application. For example, when the server 11 runs a program of a mobile group office platform, the server may be implemented as a server end of the mobile group office platform. In the technical solutions of the one or more embodiments of this specification, the server 11 may cooperate with clients run on the mobile phones 13 to 15 to implement receiving and sending on communication messages.

In this embodiment, the mobile group office platform may not only implement a communication function, and may be also used as an integrated function platform of many other functions, for example, processing of an internal event of a group such as a review and approval event (for example, review and approval events such as requesting time off, applying for office supplies, and financial affairs), an attendance checking event, a task event, or a log event, or processing of an external event of the group such as ordering food or purchasing, which is not limited in the one or more embodiments of this specification.

For example, the mobile group office platform may be carried on an instant messaging application in the related technologies, for example, an enterprise instant messaging (EIM) application, such as Skype For Business®, Microsoft Teams®, Yammer®, Workplace®, Slack®, WeCom®, FXiaoKe®, Fetion Enterprise®, or EasyChat Enterprise®. The instant messaging function is merely one of the communication functions supported by the mobile group office platform, and the mobile group office platform may further implement many other functions described above, which are not repeatedly described herein.

The mobile phones 13 to 15 are merely one type of electronic devices that can be used by the user. The following types of electronic devices may also be used by the user apparently: a tablet device, a notebook computer, a personal digital assistant (PDA), a wearable device (such as smart glasses or a smartwatch), and the like. This is not limited in the one or more embodiments of this specification. During operations, the electronic device may run a program on a client side of an application, to implement a related service function of the application. For example, when the electronic device runs a program of a mobile group office platform, the electronic device may be implemented as a client of the mobile group office platform. For example, when a user A uses the mobile phone 13 and a user B uses the mobile phone 14, the user A may input and generate a communication message on the mobile phone 13, the mobile phone 13 may implement the message input solution of this specification in this process, and the mobile phone 14 may receive and display the communication message generated by the mobile phone 13, for the mobile phone 14 to implement the message display solution of this specification in this process.

In some embodiments, an application program of a client of the mobile group office platform may be pre-installed on the electronic device, for the client to be started and run on the electronic device. When an online "client" of a technology such as HTML5 is used, the client may be obtained and run without installing a corresponding application program on the electronic device.

The network 12 through which the mobile phones 13 to 15 and the server 11 interact with each other may include a plurality of types of wired or wireless networks. In an embodiment, the network 12 may include a public switched telephone network (PSTN) and the Internet. In addition, electronic devices such as the mobile phones 13 to 15 may also implement communication interaction with each other through the network 12. For example, a single chat communication session is established between any two electronic devices, or a plurality of electronic devices may participate in the same group chat communication session, for any user to send a communication message to all other users in the group chat communication session by using an electronic device of the user.

Figure 2:
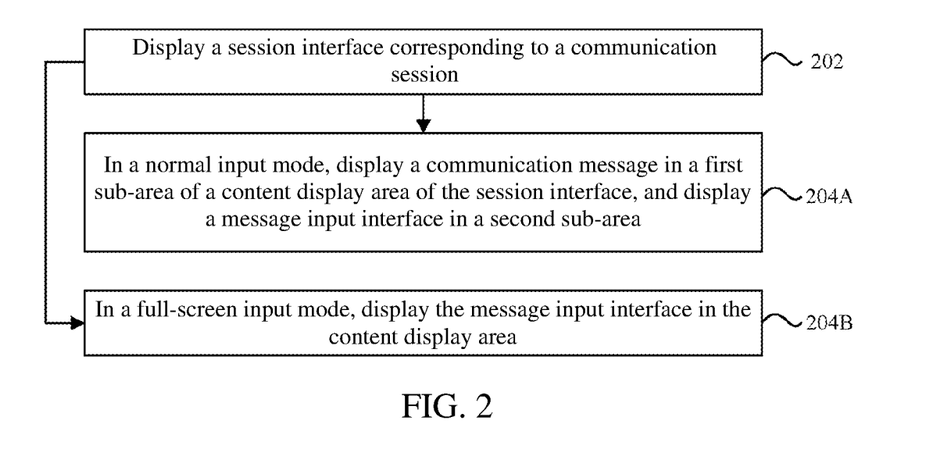
FIG. 2 is a flowchart of a message input method, according to an exemplary embodiment.

FIG. 2 is a flowchart of a message input method, according to an exemplary embodiment. As shown in FIG. 2, the method is applicable to an electronic device (for example, the mobile phones 13 to 15 shown in FIG. 1), and may include the following steps:

Step 202: Displaying a session interface corresponding to a communication session.

In an embodiment, a client of an application is run on the electronic device, and the application includes a communication function. The application may further include other functions in addition to the communication function, and this is not limited in this specification. For example, the application may be an instant messaging application, or the application may be an enterprise instant messaging application.

In an embodiment, when the electronic device implements the corresponding communication function by running the client of the application, a user of the electronic device may implement communication based on the communication function. For example, the user may implement communication by using a communication session on the client. For example, a user A and a user B may respectively use an electronic device, for a single chat communication session to be established between the user A and the user B. A session interface corresponding to the communication session may be respectively presented on the electronic device used by the user A and the electronic device used by the user B, for a communication message to be inputted based on the session interface and the communication message to be received and sent.

Step 204A: In a normal input mode, displaying a communication message in a first sub-area of a content display area of the session interface, and displaying a message input interface in a second sub-area.

Step 204B: In a full-screen input mode, displaying the message input interface in the content display area.

In an embodiment, in a normal input mode, a received or sent communication message and a message input interface may be displayed in the session interface at the same time, for the user to implement an input operation in the message input interface while viewing the communication message, for display of the communication message and implementation of the input operation to be carried out at the same time without interfering with each other.

The screen size of an electronic device is limited, and in particular, the screen size of a mobile electronic device is relatively smaller. The message input interface in the normal input mode can only occupy a part (that is, the foregoing second sub-area) of a content display area of the session interface. A size of the message input interface is therefore relatively small, and generally only 3 to 5 lines of message content can be displayed at the same time. When the user inputs a relatively large amount of message content, the message input interface can only generate a scroll bar, and the user needs to drag the scroll bar to view message content that is not shown. As a result, operations are inconvenient, and a misoperation is likely to occur.

Therefore, when a user needs to input a relatively large amount of message content, the user may switch the mode from the normal input mode to a full-screen input mode, for the message input interface to be displayed in the entire content display area. That is, a first size of the message input interface in the full-screen input mode is greater than a second size of the message input interface in the normal input mode, for more message content to be displayed at the same time. In one case, the content amount of message content of the user in the full-screen input mode may be limited, to prevent the content amount from triggering a scroll bar. In another case, the content amount of the message content is allowed to trigger a scroll bar, but the entire content display area is used for displaying the message input interface, making the size of the scroll bar in this case larger relative to that in the normal input mode. Therefore, when a user operation is carried out in the same condition, it is more convenient for the user to drag the scroll bar, and a misoperation is less likely to occur.

In an embodiment, the message input interface in the normal input mode may display a preset amount of message content. When the message content inputted by the user does not exceed the preset amount, the normal input mode may be kept; and when the message content exceeds the preset amount, the mode may be automatically switched to the full-screen input mode, to avoid showing a scroll bar. After a communication message is sent, the normal input mode may be automatically restored from the full-screen input mode, or may be restored by the user through manual switching.

In some embodiments, a message input method may be performed by a client and may include displaying a session interface corresponding to a communication session; in a normal input mode, displaying a communication message in a first sub-area of a content display area of the session interface, and displaying a message input interface in a second sub-area of the content display area of the session interface; monitoring a message content being inputted by a user (e.g., a length of a message being inputted) at the session interface; in response to determining an amount of the message content exceeding a threshold, switching from the normal input mode to a full-screen input mode; and in the full-screen input mode, expanding the display of the message input interface to the content display area entirely. When the switch takes place, the inputted portion of the message content may remain in the message input interface for the user to finish the rest of the message after the switch and before the message input is finished and the message is sent. In one embodiment, the expanding step may be performed through invoking an advanced processing module of the client. Expanding the display of the message input interface to the content display area entirely may include merging the first sub-area into the second sub-area, and converting the first sub-area for displaying the message input interface. Thus, expanding the display of the message input interface may take up the entire content display area, such that the size of the message input interface in the full-screen input mode is the size of the content display area.

In an embodiment, the message input interface in the normal input mode may display a preset amount of message content. When the message content inputted by the user does not exceed the preset amount, the normal input mode may be kept; and when the message content exceeds the preset amount, the normal input mode is still kept, and a switching option for switching to the full-screen input mode is shown to the user, for the user to actively choose whether to switch to the full-screen input mode. After a communication message is sent, the normal input mode may be automatically restored from the full-screen input mode, or may be restored by the user through manual switching.

In an embodiment, the electronic device can show the switching option between the normal input mode and the full-screen input mode all the time, for the user to perform switching as required at any time without considering a content amount of the inputted message content.

In an embodiment, the electronic device is configured as a client, and the client may include a normal processing module and an advanced processing module, which are respectively configured to implement the normal input mode and the full-screen input mode. Therefore, the client may invoke the normal processing module to generate the message input interface in the normal input mode and display the message input interface in the second sub-area; and the client may invoke the advanced processing module to generate the message input interface in the full-screen input mode and display the message input interface in the content display area.

In an embodiment, in addition to the size difference in the message input interface, the client may provide differential editing functions in the normal input mode and the full-screen input mode, to edit the inputted message content in the message input interface. For example, in the normal input mode, a basic editing function is provided for the inputted content in the message input interface, and in the full-screen input mode, the basic editing function and/or an extended editing function different from the basic editing function is provided for the inputted content in the message input interface. For example, the basic editing function may include cutting or deleting the message content or adjusting a font size of the message content; and the extended editing function may include adjusting a font, a color, a character spacing, a line spacing, and the like, which are not limited in this specification. In brief, the extended editing function can implement stronger editing functions relative to the basic editing function, to meet application requirements of the user.

In an embodiment, the advanced processing module includes a document editing module. In other words, in this specification, document editing functions provided by document editing tools such as Microsoft Word and WPS Word in the related technologies are developed into the document editing module, and the document editing module is integrated in the client run on the electronic device, for the user to edit message content in a process of inputting the message content in the session interface without editing the message content by using an additional document editing tool and then copying the message content into the message input interface. In addition, the document editing module is integrated in the client. In this way, when the user receives a communication message generated based on the advanced processing module, message content of the communication message may be directly displayed in the session interface, for the user to directly view the message content. This is apparently more intuitive and convenient than using a document format, obviates processes such as downloading a document, opening a document viewing tool/application, and the like, and is particularly applicable to the mobile group office scenario.

In an embodiment, in the normal input mode, the client may generate a communication message in a normal format according to inputted content in the message input interface; and in the full-screen input mode, the client may generate a communication message in a special format according to the inputted content in the message input interface.

In an embodiment, a difference between the communication message in the normal format and the communication message in the special format merely lies in the manner that the message content is packaged, and elements included in the message content may be consistent. For example, the message content of the communication messages both includes text. In another embodiment, in addition to different packaging manners used, element types included in the communication message in the normal format and in the communication message in the special format may also be different. For the communication message in the normal format, that is, the communication message in the related technologies, the communication message may include only a single type of elements, such as text, picture, video, audio, or document. The user can only input text (emoticons such as emoji may be further included) in the message input interface, and may select a picture (or a video, audio, or a document) additionally for transmission. However, the client may generate different communication messages for the text and the picture, and send the communication messages respectively, for each communication message to include only one type of elements eventually. The communication message in the special format may include at least one of the following elements: text, picture, video, audio, document, and the like. That is, the client may integrate a plurality of types of elements in the same communication message for transmission, and each communication message may include one or more types of elements eventually. In the full-screen input mode, the inputted text and the selected non-text elements may be displayed in the message input interface according to a received arrangement instruction without generating communication messages respectively; and correspondingly, the client may arrange the inputted content in the message input interface according to a received arrangement instruction.

In some embodiments, after a user sends a message through the client, the user may receive a reply (e.g., a different communication message) to the sent message in the same communication session. Accordingly, the client may obtain the different communication message generated in the communication session. When the different communication message is in a normal format (corresponding to the normal input mode), the client may invoke a normal processing module to parse the different communication message, or when the different communication message is in a special format (corresponding to the full-screen input mode), the client may invoking an advanced processing module to parse the different communication message. That is, depending on whether the reply was generated in the normal format or special format (that is, the input mode of the reply), the client may process the reply differently. The reply may be generated on a different client with similar components and functions as the client. Then, the client may display, in the session interface corresponding to the communication session, message content obtained through parsing the different communication message.

Figure 3:
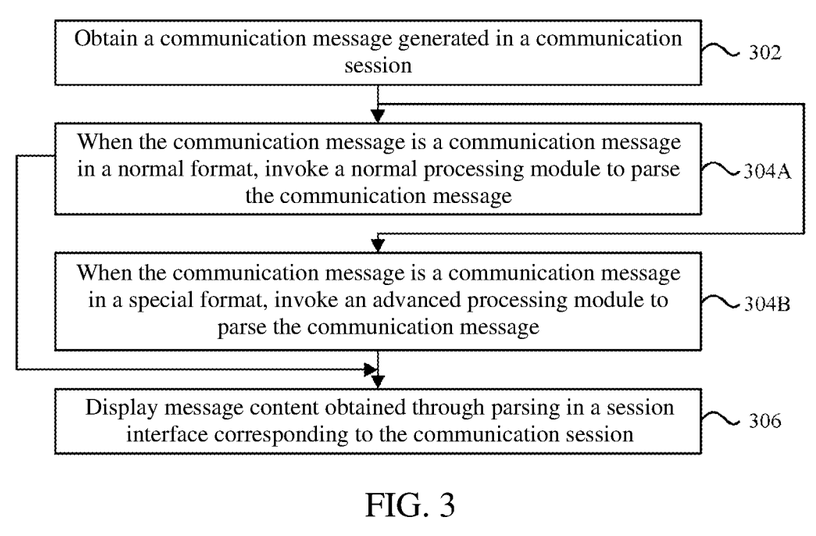
FIG. 3 is a flowchart of a message display method, according to an exemplary embodiment.

FIG. 3 is a flowchart of a message display method, according to an exemplary embodiment. As shown in FIG. 3, the method is applicable to an electronic device (for example, the mobile phones 13 to 15 shown in FIG. 1), and may include the following steps:

Step 302: Obtaining a communication message generated in a communication session.

In an embodiment, a client of an application is run on the electronic device, and the application includes a communication function. The application may further include other functions in addition to the communication function, and this is not limited in this specification. For example, the application may be an instant messaging application, or the application may be an enterprise instant messaging application.

In an embodiment, when the electronic device implements the corresponding communication function by running the client of the application, a user of the electronic device may implement communication based on the communication function. For example, the user may implement communication by using a communication session on the client. For example, a user A and a user B may respectively use an electronic device, for a single chat communication session to be established between the user A and the user B. A session interface corresponding to the communication session may be respectively presented on the electronic device used by the user A and the electronic device used by the user B, for a communication message to be inputted based on the session interface and the communication message to be received and sent.

Step 304A: When the communication message is a communication message in a normal format, invoking a normal processing module to parse the communication message.

Step 304B: When the communication message is a communication message in a special format, invoking an advanced processing module to parse the communication message.

In an embodiment, a difference between the communication message in the normal format and the communication message in the special format merely lies in the manner that the message content is packaged, and elements included in the message content may be consistent, for example, the message content of the communication messages both includes text. In another embodiment, in addition to different packaging manners used, element types included in the communication message in the normal format and in the communication message in the special format may also be different. For the communication message in the normal format, that is, the communication message in the related technologies, the communication message may include only a single type of elements, such as text, picture, video, audio, or document. The user can only input text (emoticons such as emoji may be further included) in the message input interface, and may select a picture (or a video, audio, or a document) additionally for transmission. However, the client may generate different communication messages for the text and the picture, and send the communication messages respectively, for each communication message to include only one type of elements eventually. The communication message in the special format may include at least one of the following elements: text, picture, video, audio, document, and the like. That is, the client may integrate a plurality of types of elements in the same communication message for transmission, and each communication message may include one or more types of elements eventually. In the full-screen input mode, inputted text and selected non-text elements may be displayed in the message input interface without generating communication messages respectively; and correspondingly, the client may arrange the inputted content in the message input interface according to a received arrangement instruction.

In an embodiment, the communication message in the normal format is generated by a sender in a normal input mode; and the communication message in the special format is generated by the sender in a full-screen input mode.

In an embodiment, in a normal input mode, a received or sent communication message and a message input interface may be displayed in the session interface at the same time, for the user to implement an input operation in the message input interface while viewing the communication message, for display of the communication message and implementation of the input operation to be carried out at the same time without interfering with each other.

The screen size of an electronic device is limited, and in particular, the screen size of a mobile electronic device is relatively smaller. The message input interface in the normal input mode can only occupy a part (that is, the foregoing second sub-area) of a content display area of the session interface. A size of the message input interface is therefore relatively small, and generally only 3 to 5 lines of message content can be displayed at the same time. When the user inputs a relatively large amount of message content, the message input interface can only generate a scroll bar, and the user needs to drag the scroll bar to view message content that is not shown. As a result, operations are inconvenient, and a misoperation is likely to occur.

Therefore, when a user needs to input a relatively large amount of message content, the user may switch the mode from the normal input mode to a full-screen input mode, for the message input interface to be displayed in the entire content display area. That is, a first size of the message input interface in the full-screen input mode is greater than a second size of the message input interface in the normal input mode, for more message content to be displayed at the same time. In one case, the content amount of message content of the user in the full-screen input mode may be limited, to prevent the content amount from triggering a scroll bar. In another case, the content amount of the message content is allowed to trigger a scroll bar, but the entire content display area is used for displaying the message input interface, making the size of the scroll bar in this case larger relative to that in the normal input mode. Therefore, when a user operation is carried out in the same condition, it is more convenient for the user to drag the scroll bar, and a misoperation is less likely to occur.

In an embodiment, the message input interface in the normal input mode may display a preset amount of message content. When the message content inputted by the user does not exceed the preset amount, the normal input mode may be kept; and when the message content exceeds the preset amount, the mode may be automatically switched to the full-screen input mode, to avoid showing a scroll bar. After a communication message is sent, the normal input mode may be automatically restored from the full-screen input mode, or may be restored by the user through manual switching.

In an embodiment, the message input interface in the normal input mode may display a preset amount of message content. When the message content inputted by the user does not exceed the preset amount, the normal input mode may be kept; and when the message content exceeds the preset amount, the normal input mode is still kept, and a switching option for switching to the full-screen input mode is shown to the user, for the user to actively choose whether to switch to the full-screen input mode. After a communication message is sent, the normal input mode may be automatically restored from the full-screen input mode, or may be restored by the user through manual switching.

In an embodiment, the electronic device can show the switching option between the normal input mode and the full-screen input mode all the time, for the user to perform switching as required at any time without considering a content amount of the inputted message content.

In an embodiment, the electronic device is configured as a client, and the client may include a normal processing module and an advanced processing module, which are respectively configured to implement the normal input mode and the full-screen input mode. Therefore, the client may invoke the normal processing module to generate the message input interface in the normal input mode and display the message input interface in the second sub-area; and the client may invoke the advanced processing module to generate the message input interface in the full-screen input mode and display the message input interface in the content display area.

In an embodiment, in addition to the size difference in the message input interface, the client may provide differential editing functions in the normal input mode and the full-screen input mode, to edit the inputted message content in the message input interface. For example, in the normal input mode, a basic editing function is provided for the inputted content in the message input interface, and in the full-screen input mode, the basic editing function and/or an extended editing function different from the basic editing function is provided for the inputted content in the message input interface. For example, the basic editing function may include cutting or deleting the message content or adjusting a font size of the message content; and the extended editing function may include adjusting a font, a color, a character spacing, a line spacing, and the like, which are not limited in this specification. In brief, the extended editing function can implement stronger editing functions relative to the basic editing function, to meet application requirements of the user.

In an embodiment, the advanced processing module includes a document editing module. In other words, in this specification, document editing functions provided by document editing tools such as Microsoft Word and WPS Word in the related technologies are developed into the document editing module, and the document editing module is integrated in the client run on the electronic device, for the user to edit message content in a process of inputting the message content in the session interface without editing the message content by using an additional document editing tool and then copying the message content into the message input interface. In addition, the document editing module is integrated in the client. In this way, when the user receives a communication message generated based on the advanced processing module, message content of the communication message may be directly displayed in the session interface, for the user to directly view the message content. This is apparently more intuitive and convenient than using a document format, obviates processes such as downloading a document, opening a document viewing tool/application, and the like, and is particularly applicable to the mobile group office scenario.

Step 306: Displaying message content obtained through parsing in a session interface corresponding to the communication session.

In an embodiment, for communication messages in different formats, the client may invoke different modules respectively to parse the communication messages, and display the communication messages in the same manner or similar manners after the parsing, without the user realizing differences between the communication messages, which helps the user to receive consistent use experience.

For ease of understanding, technical solutions of the one or more embodiments of this specification are described by using an enterprise instant messaging application T as an example.

Figure 4:
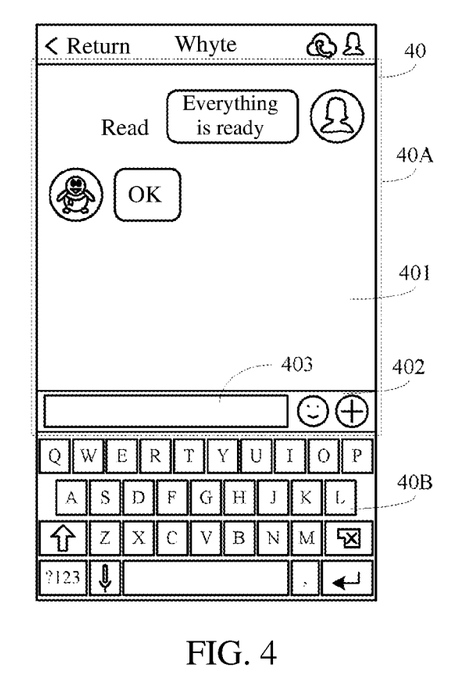
FIG. 4 is a schematic diagram of a session interface, according to an exemplary embodiment.

FIG. 4 is a schematic diagram of a session interface, according to an exemplary embodiment. It is assumed that a client program of the application T is run on an electronic device used by a user Blake, and therefore the electronic device is configured as a client 1 of the application T. Similarly, an electronic device used by a user Whyte may be configured as a client 2 of the application T. In this case, the user Blake and the user Whyte may implement communication based on the client 1 and the client 2. For example, the user Blake and the user Whyte may establish a single chat communication session, for the client 1 to present a session interface 40 shown in FIG. 4 to the user Blake.

The session interface 40 may include a content display area 40A. The content display area 40A may further include a first sub-area 401 and a second sub-area 402. The first sub-area 401 is used for displaying communication messages generated between the user Blake and the user Whyte, and the second sub-area 402 is used for displaying a message input interface 403. In the session interface 40 shown in FIG. 4, in addition to the content display area 40A, a keyboard display area 40B is further included. The keyboard display area 40B is used for displaying a virtual keyboard. When the user Blake triggers the message input interface 403, the session interface 40 includes the content display area 40A and the keyboard display area 40B shown in FIG. 4. When the user Blake has not triggered the message input interface 403, the virtual keyboard is in a hidden state, and the occupied area of the keyboard display area 40B is included into the content display area 40A.

The session interface 40 shown in FIG. 4 is in a normal input mode, for the content display area 40A to include both the first sub-area 401 and the second sub-area 402. Therefore, the message input interface 403 located in the second sub-area 402 only occupies a part of area of the content display area 40A. In the normal input mode, the size of the message input interface 403 is relatively small, but it may be convenient for the user Blake to view communication messages in the first sub-area 401 while making an input entry.

However, the message input interface 403 of a relatively small size can accommodate relatively less message content, for example, generally may include 3 to 5 lines of text, and more content may trigger a scroll bar in the message input interface 403. In this case, the user Blake needs to drag the scroll bar to view other content in addition to the 3 to 5 lines of content shown. Therefore, in a case that there is a relatively large amount of message content, for ease of viewing the context and adjusting the inputted message content, the user Blake intends to increase the size of the message input interface 403, for the message input interface 403 to display more message content at the same time.

Figure 5:
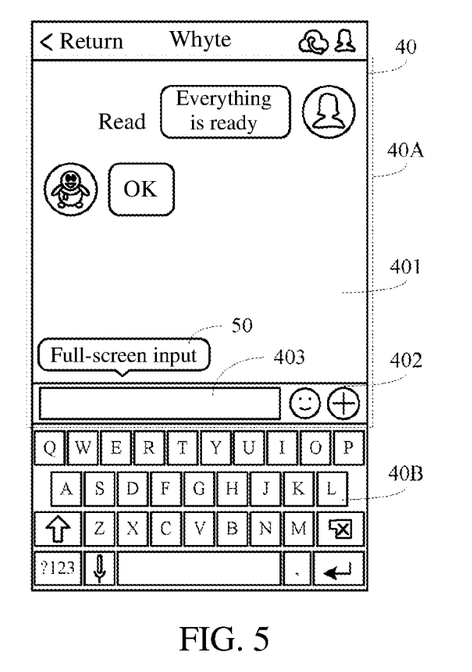
FIG. 5 is a schematic diagram of switching from a normal input mode to a full-screen input mode, according to an exemplary embodiment.
Figure 6:
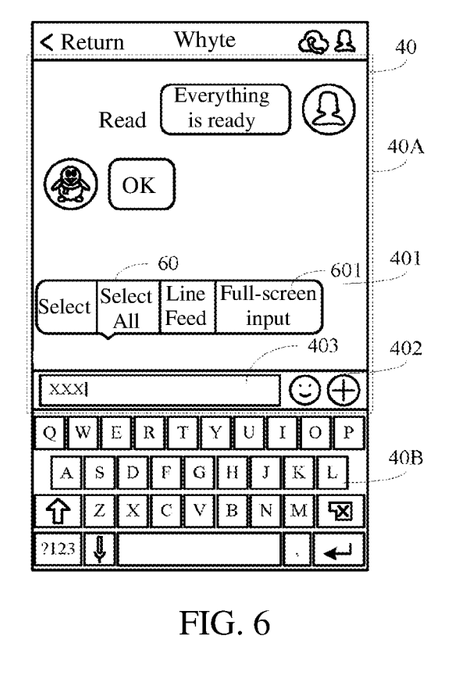
FIG. 6 is another schematic diagram of switching from a normal input mode to a full-screen input mode, according to an exemplary embodiment.
Figure 7:
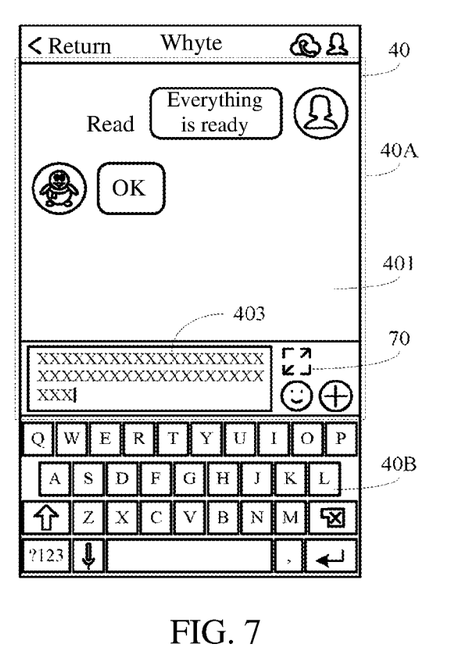
FIG. 7 is still another schematic diagram of switching from a normal input mode to a full-screen input mode, according to an exemplary embodiment.

FIG. 5 is a schematic diagram of switching from a normal input mode to a full-screen input mode, according to an exemplary embodiment. When it is detected that the user Blake has performed a preset operation such as long press on a blank message input interface 403, a mode switching option 50 shown in FIG. 5 may pop up, for the user Blake to trigger the mode switching option 50 to switch from the normal input mode to the full-screen input mode, to increase the size of the message input interface 403. FIG. 6 is another schematic diagram of switching from a normal input mode to a full-screen input mode, according to an exemplary embodiment. When it is detected that the user Blake has performed a preset operation such as long press on a message input interface 403 with inputted content, a function menu 60 shown in FIG. 6 may pop up, and the function menu 60 includes a mode switching option 601, for the user Blake to trigger the mode switching option 601 to switch from the normal input mode to the full-screen input mode, to increase the size of the message input interface 403. FIG. 7 is still another schematic diagram of switching from a normal input mode to a full-screen input mode, according to an exemplary embodiment. When it is detected that the user Blake has inputted a relatively large amount of content in the message input interface 403, for example, 3 or more lines of content (for example, the message input interface 403 can display at most 3 lines of content), a mode switching option 70 shown in FIG. 7 may be displayed, for the user Blake to trigger the mode switching option 70 to switch from the normal input mode to the full-screen input mode, to increase the size of the message input interface 403.

Figure 8:
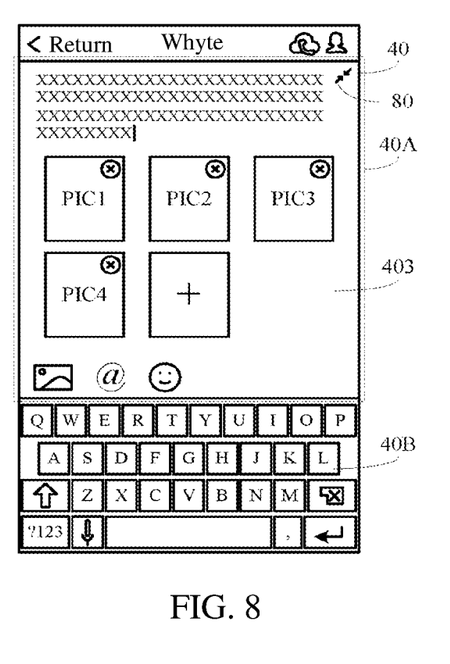
FIG. 8 is a schematic diagram of a session interface in a full-screen input mode, according to an exemplary embodiment.

FIG. 8 is a schematic diagram of a session interface in a full-screen input mode, according to an exemplary embodiment. As shown in FIG. 8, in the full-screen input mode, the content display area 40A may be completely used for displaying the message input interface 403, and no longer display the communication messages in the first sub-area, for the user Blake to implement message input in a relatively large area. After the message input is completed and a corresponding communication message is sent, the client 1 may automatically restore the default normal input mode from the full-screen input mode, to wait for a next input operation. Alternatively, the session interface 40 may include a mode switching option 80 shown in FIG. 8, for the user Blake to trigger the mode switching option 80 to switch from the full-screen input mode to the normal input mode, whereas the client 1 does not implement automatic mode switching.

In addition to the size difference in the message input interface 403, the client 1 may implement differential editing functions in the full-screen input mode and in the normal input mode. For example, the normal input mode is similar to a communication application in the related technologies. The user Blake may input text in the message input interface 403, or select a picture, a video, audio, or a document by triggering a mark "+" in the second sub-area. The client 1 may then generate corresponding communication messages respectively for the text in the message input interface 403 and the picture, the video, the audio, or the document selected by the user Blake, to send the communication messages to the user Whyte. In this process, only the text can appear in the message input interface 403, and the selected picture, video, audio, or document may not appear in the message input interface 403, making it impossible for the user Blake to implement editing and arrangement of a plurality of elements between the text and the picture, the video, the audio, or the document. Correspondingly, the user Whyte can only receive the plurality of communication messages sent by the user Blake respectively. Each communication message includes only the text, the picture, the video, the audio, or the document and cannot form a piece of complete message content including a plurality of elements.

Figure 9:
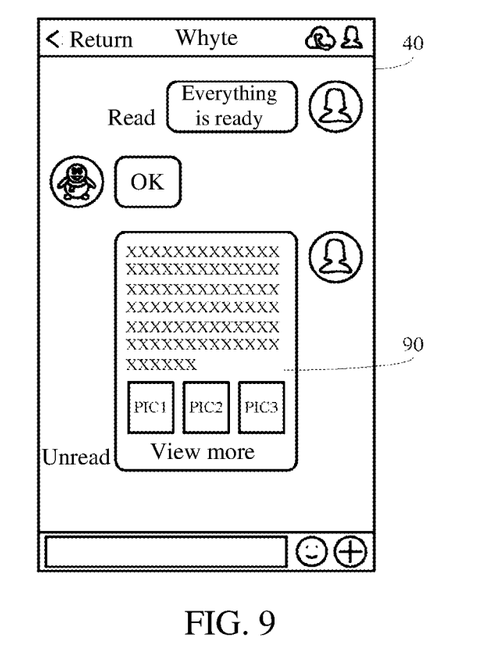
FIG. 9 is a schematic diagram of displaying a sent message on a sender side, according to an exemplary embodiment.
Figure 10:
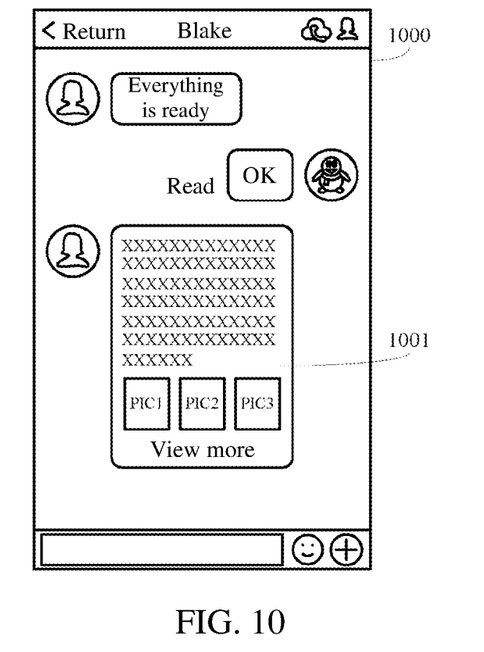
FIG. 10 is a schematic diagram of displaying a received message on a recipient side, according to an exemplary embodiment.

In the embodiment shown in FIG. 8, inputted text and selected pictures PIC1 to PIC4 of the user Blake may all be displayed in the message input interface 403, for the user Blake to respectively edit the text and the pictures, or arrange a sequence of the text and the pictures. In addition, the client 1 may generate a communication message for all content such as the text and the pictures included in the message input interface 403 and send the communication message to the user Whyte. For example, FIG. 9 is a schematic diagram of displaying a sent message on a sender side, according to an exemplary embodiment, which includes a sent communication message 90 displayed by the client 1. FIG. 10 is a schematic diagram of displaying a received message on a recipient side, according to an exemplary embodiment, which includes a received communication message 1001 displayed by the client 2 in a session interface 1000.

As can be seen from FIG. 9 and FIG. 10, a communication message generated in the full-screen input mode and a communication message generated in the normal input mode have similar representation formats. Each communication message may be directly presented in a corresponding session interface. In this way, as a recipient, a difference between the input modes may not result in a significant difference to the user Whyte in a process of reading the message, for the user Whyte to receive consistent use experience. An existing difference lies in that: as described above, the full-screen input mode can implement editing and arrangement of a plurality of elements, a communication message is generated for all elements in the message input interface 403, for the user Whyte to view message content such as text and pictures altogether in the communication message 1001. In addition, the message content may be particularly arranged, for the user Whyte to conveniently view and understand the message content.

Figure 11:
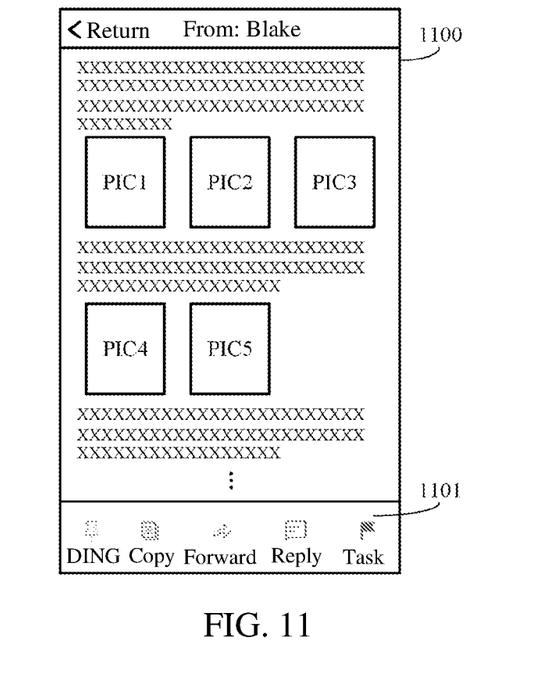
FIG. 11 is a schematic diagram of a message content viewing interface, according to an exemplary embodiment.

In some embodiments, if the communication message sent by the user Blake has an excessive amount of message content, only a part of message content is shown. For example, the communication message 90 shown in FIG. 9 or the communication message 1001 shown in FIG. 10 only shows a part of text and pictures, and all the message content can be viewed by triggering an option "View more". Using FIG. 10 as an example, when the user Whyte triggers the option "View more", the client 2 may switch to a message content viewing interface 1100 shown in FIG. 11, and the message content viewing interface 1100 is used for displaying all content of the communication message 1001. Further, the user Whyte may further process the displayed message content by using an operation menu 1101 included in the message content viewing interface 1100. For example, an option "DING" is used for generating a prompt message, and content of the prompt message is the foregoing message content. An option "Copy" is used for copying the foregoing message content. An option "Forward" is used for forwarding the foregoing message content. An option "Reply" is used for making a reply in response to the foregoing message content, and generating a communication message related to the message content for a reply message and returning the communication message to the user Blake. An option "Task" is used for generating a task event, and content of the task event is the foregoing message content.

In some embodiments, the client 1 (a case of the client 2 is similar) may include a normal processing module and an advanced processing module. The user Blake may use a basic editing function provided by the normal processing module in the normal input mode, and use an extended editing function provided by the advanced processing module in the full-screen input mode (the advanced processing module may also include the basic editing function; or the normal processing module and the advanced processing module may be used in the full-screen input mode at the same time). In addition, for inputted content formed by the user Blake in the message input interface 403, the client 1 may generate a communication message in a normal format in the normal input mode or generate a communication message in a special format in the full-screen input mode. In this way, after receiving a corresponding communication message, the client 2 may parse the communication message in the normal format by using the normal processing module or parse the communication message in the special format by using the advanced processing module to present the communication message as the communication message 1001 shown in FIG. 10.

The client 2 used by the user Whyte may not include the advanced processing module due to an excessively low version. In this case, the communication message in the special format may fail to be correctly parsed. The user Whyte needs to upgrade the version of the client 2 to obtain the advanced processing module, so as to parse the communication message in the special format and then display message content obtained through parsing.

Figure 12:
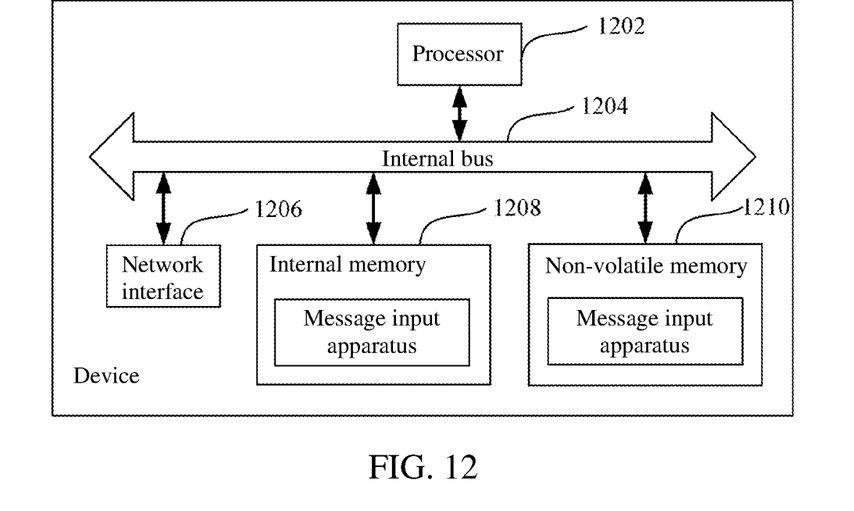
FIG. 12 is a schematic structural diagram of a device, according to an exemplary embodiment.

FIG. 12 is a schematic structural diagram of a device, according to an exemplary embodiment. Referring to FIG. 12, at a hardware level, the device includes a processor 1202, an internal bus 1204, a network interface 1206, an internal memory 1208, and a non-volatile memory 1210, and may further include hardware required for other services. The processor 1202 reads a corresponding computer program from the non-volatile memory 1210 into the internal memory 1208 and then executes the computer program, to form a message input apparatus at a logic level. In addition to a software implementation, one or more embodiments of this specification do not exclude other implementations, for example, logic devices or a software-hardware combination. That is, execution bodies of the following processing procedures are not limited to logic units and may alternatively be hardware or logic devices.

Figure 13:
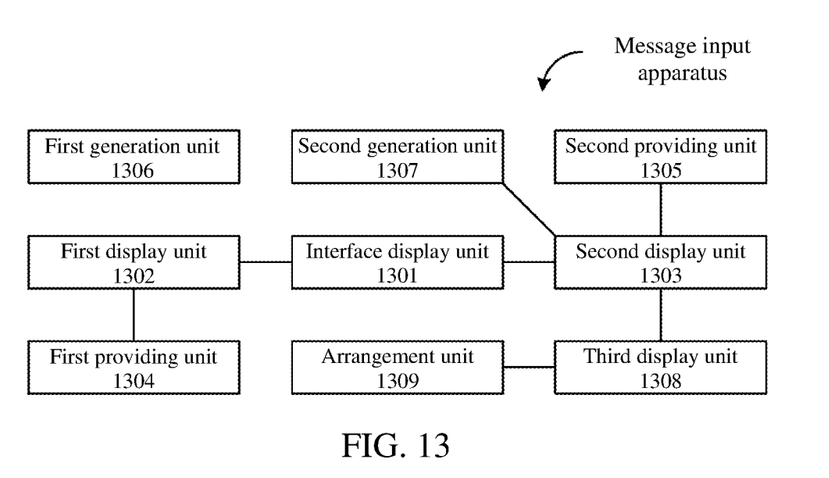
FIG. 13 is a block diagram of a message input apparatus, according to an exemplary embodiment.

Referring to FIG. 13, in a software implementation, the message input apparatus may include: an interface display unit 1301, configured to display a session interface corresponding to a communication session; a first display unit 1302, configured to: in a normal input mode, display a communication message in a first sub-area of a content display area of the session interface, and display a message input interface in a second sub-area; and a second display unit 1303, configured to: in a full-screen input mode, display the message input interface in the content display area.

Optionally, a first size of the message input interface in the full-screen input mode is greater than a second size of the message input interface in the normal input mode.

Optionally, the first display unit 1302 is configured to invoke a normal processing module to generate and display the message input interface; and the second display unit 1303 is configured to invoke an advanced processing module to generate and display the message input interface.

Optionally, the advanced processing module includes a document editing module.

Optionally, the apparatus further includes: a first providing unit 1304, configured to: in the normal input mode, provide a basic editing function for inputted content in the message input interface; and a second providing unit 1305, configured to: in the full-screen input mode, provide the basic editing function and/or an extended editing function different from the basic editing function for the inputted content in the message input interface.

Optionally, the apparatus further includes: a first generation unit 1306, configured to: in the normal input mode, generate a communication message in a normal format according to inputted content in the message input interface; and a second generation unit 1307, configured to: in the full-screen input mode, generate a communication message in a special format according to the inputted content in the message input interface.

Optionally, the communication message in the special format includes at least one of the following elements: text, picture, video, audio, and document.

Optionally, the apparatus further includes: a third display unit 1308, configured to: in the full-screen input mode, display inputted text and selected non-text elements in the message input interface; and an arrangement unit 1309, configured to arrange inputted content in the message input interface according to a received arrangement instruction.

Figure 14:
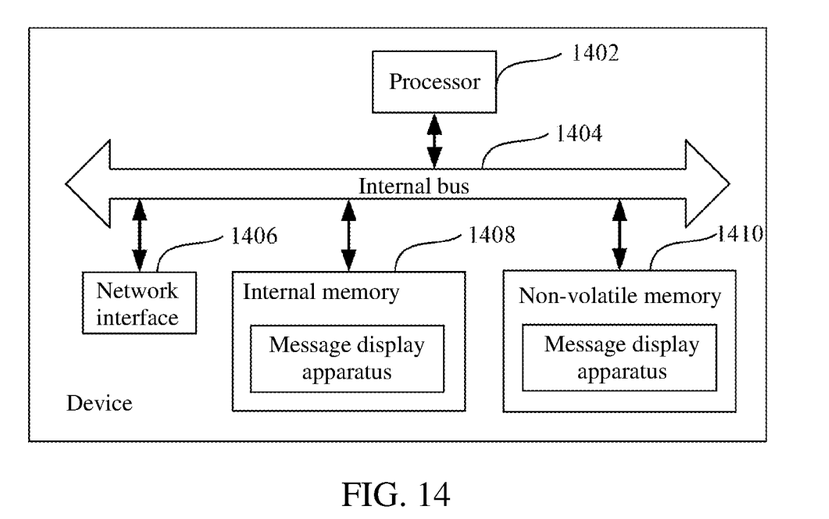
FIG. 14 is a schematic structural diagram of another device, according to an exemplary embodiment.

FIG. 14 is a schematic structural diagram of a device, according to an exemplary embodiment. Referring to FIG. 14, at a hardware level, the device includes a processor 1402, an internal bus 1404, a network interface 1406, an internal memory 1408, and a non-volatile memory 1410, and may further include hardware required for other services. The processor 1402 reads a corresponding computer program from the non-volatile memory 1410 into the internal memory 1408 and then executes the computer program, to form a message display apparatus at a logic level. In addition to a software implementation, one or more embodiments of this specification do not exclude other implementations, for example, logic devices or a software-hardware combination. That is, execution bodies of the following processing procedures are not limited to logic units and may alternatively be hardware or logic devices.

Figure 15:
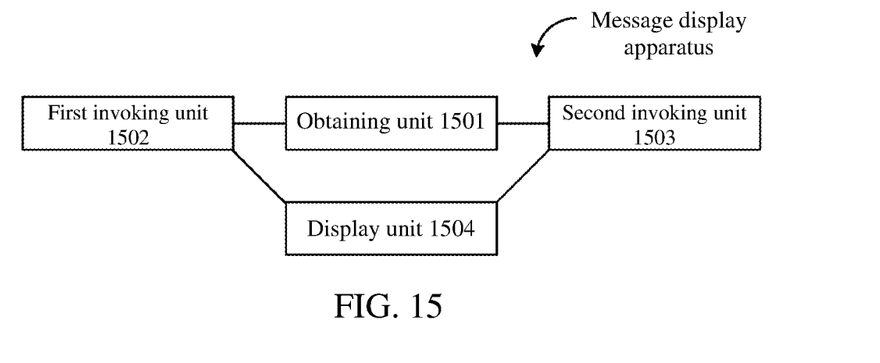
FIG. 15 is a block diagram of a message display apparatus, according to an exemplary embodiment.

Referring to FIG. 15, in a software implementation, the message display apparatus may include: an obtaining unit 1501, configured to obtain a communication message generated in a communication session; a first invoking unit 1502, configured to: when the communication message is a communication message in a normal format, invoke a normal processing module to parse the communication message; a second invoking unit 1503, configured to: when the communication message is a communication message in a special format, invoke an advanced processing module to parse the communication message; and a display unit 1504, configured to display message content obtained through parsing in a session interface corresponding to the communication session.

Optionally, the communication message in the normal format is generated by a sender in a normal input mode; and the communication message in the special format is generated by the sender in a full-screen input mode.

The system, the apparatus, the module, or the unit described in the foregoing embodiments may be implemented by a computer chip or an entity, or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (CPUs), an input/output interface, a network interface, and an internal memory.

The internal memory may include a form such as a volatile memory, a random access memory (RAM), and/or a non-volatile memory such as a read-only memory (ROM) or a flash memory (flash RAM) in a computer-readable medium. The internal memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase-change memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage device, a cassette tape, a magnetic disk storage, a quantum memory, a graphene-based storage medium or another magnetic storage device, or any other non-transmission medium, which may be configured to store information accessible by a computing device. Based on the definition herein, the computer-readable medium does not include transitory computer-readable media (transitory media), such as a modulated data signal and a carrier.

The terms "include," "comprise," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The terms used in one or more embodiments of this specification are merely used to describe the embodiments but are not intended to limit the one or more embodiments of this specification. The "a" and "the" in a singular form used in the one or more embodiments of this specification and the appended claims are also intended to include a plural form, unless other meanings are clearly indicated in the context. The term "and/or" used herein indicates and includes any or all possible combinations of one or more associated listed items.

Although the terms "first," "second," "third," and the like may be used to describe various information in the one or more embodiments of this specification, such information should not be limited to these terms. These terms are merely used to distinguish between information of the same type. For example, without departing from the scope of the one or more embodiments of this specification, first information may also be referred to as second information. Similarly, second information may also be referred to as first information. Depending on the context, for example, the word "if" used herein may be interpreted as "while" or "when," or "in response to determining."

The foregoing descriptions are merely preferred embodiments of the one or more embodiments of this specification, but are not intended to limit the one or more embodiments of this specification. Any modification, equivalent replacement, or improvement made within the spirit and principle of the one or more embodiments of this specification shall fall within the protection scope of the one or more embodiments of this specification.

What is claimed is:

1. A message processing method, comprising:
    obtaining, by a client from a different client, a communication message generated by the different client, wherein the generation of the communication message comprises (i) a switch from a normal input mode to a full-screen input mode based on a trigger triggered by a user, wherein under the normal input mode the trigger is shown based on detection of an amount of message content being entered at a message input interface of the different client exceeds a threshold, wherein under the normal input mode, the message input interface occupies less than an entire content display area of the different client, and (ii) an expansion of the message input interface to occupy the entire content display area of the different client under the full-screen input mode;
    parsing, by the client, the communication message; and
    displaying, by the client, the message content obtained through parsing the communication message.

2. The method according to claim 1, wherein:
    in the normal input mode, the different client displays a different communication message in a first sub-area of a content display area of a session interface and displays the message input interface in a second sub-area of the content display area of the session interface.

3. The method according to claim 2, wherein:
    a size of the message input interface in the full-screen input mode is greater than a size of the message input interface in the normal input mode; and the size of the message input interface in the full-screen input mode is a size of the content display area.

4. The method according to claim 2, wherein the expansion the display of the message input interface comprises:
a merge of the first sub-area into the second sub-area; and
a conversion of the first sub-area for displaying the message input interface.

5. The method according to claim 1, wherein:
the normal input mode provides a basic editing function for editing the message content in the message input interface; and
the full-screen input mode provides the basic editing function and an extended editing function different from the basic editing function for editing the message content in the message input interface.

6. The method according to claim 1, wherein the communication message comprises at least one of the following elements: text, picture, video, audio, and document.

7. The method according to claim 1, wherein parsing the communication message comprises parsing the communication message by invoking an advanced processing module.

8. One or more non-transitory computer-readable storage media storing instructions executable by one or more processors, wherein execution of the instructions causes the one or more processors to perform operations comprising:
obtaining, from a client, a communication message generated by the client, wherein the generation of the communication message comprises (i) a switch from a normal input mode to a full-screen input mode based on a trigger triggered by a user, wherein under the normal input mode the trigger is shown based on detection of an amount of message content being entered at a message input interface of the client exceeds a threshold, wherein under the normal input mode, the message input interface occupies less than an entire content display area of the client, and (ii) an expansion of the message input interface to occupy the entire content display area of the client under the full-screen input mode;
parsing the communication message; and
displaying the message content obtained through parsing the communication message.

9. The one or more non-transitory computer-readable storage media according to claim 8, wherein:
in the normal input mode, the client displays a different communication message in a first sub-area of a content display area of a session interface and displays the message input interface in a second sub-area of the content display area of the session interface.

10. The one or more non-transitory computer-readable storage media according to claim 9, wherein:
a size of the message input interface in the full-screen input mode is greater than a size of the message input interface in the normal input mode; and
the size of the message input interface in the full-screen input mode is a size of the content display area.

11. The one or more non-transitory computer-readable storage media according to claim 9, wherein the expansion the display of the message input interface comprises:
a merge of the first sub-area into the second sub-area; and
a conversion of the first sub-area for displaying the message input interface.

12. The one or more non-transitory computer-readable storage media according to claim 8, wherein:
the normal input mode provides a basic editing function for editing the message content in the message input interface; and
the full-screen input mode provides the basic editing function and an extended editing function different from the basic editing function for editing the message content in the message input interface.

13. The one or more non-transitory computer-readable storage media according to claim 8, wherein the communication message comprises at least one of the following elements: text, picture, video, audio, and document.

14. The one or more non-transitory computer-readable storage media according to claim 8, wherein parsing the communication message comprises parsing the communication message by invoking an advanced processing module.

15. A system comprising one or more processors and one or more non-transitory computer-readable memories coupled to the one or more processors and configured with instructions executable by the one or more processors to cause the system to perform operations comprising:
obtaining, from a client, a communication message generated by the client, wherein the generation of the communication message comprises (i) a switch from a normal input mode to a full-screen input mode based on a trigger triggered by a user, wherein under the normal input mode the trigger is shown based on detection of an amount of message content being entered at a message input interface of the client exceeds a threshold, wherein under the normal input mode, the message input interface occupies less than an entire content display area of the client, and (ii) an expansion of the message input interface to occupy the entire content display area of the client under the full-screen input mode;
parsing the communication message; and
displaying the message content obtained through parsing the communication message.

16. The system according to claim 15, wherein:
in the normal input mode, the client displays a different communication message in a first sub-area of a content display area of a session interface and displays the message input interface in a second sub-area of the content display area of the session interface.

17. The system according to claim 16, wherein:
a size of the message input interface in the full-screen input mode is greater than a size of the message input interface in the normal input mode; and
the size of the message input interface in the full-screen input mode is a size of the content display area.

18. The system according to claim 16, wherein the expansion the display of the message input interface comprises:
a merge of the first sub-area into the second sub-area; and
a conversion of the first sub-area for displaying the message input interface.

19. The system according to claim 15, wherein:
the normal input mode provides a basic editing function for editing the message content in the message input interface; and
the full-screen input mode provides the basic editing function and an extended editing function different from the basic editing function for editing the message content in the message input interface.

20. The system according to claim 15, wherein the communication message comprises at least one of the following elements: text, picture, video, audio, and document.

* * * * *